United States Patent

[11] 3,572,593

| [72] | Inventor | Peter V. Guarisco |
| | | Morgan City, La. |
| [21] | Appl. No. | 804,057 |
| [22] | Filed | Feb. 28, 1969 |
| [45] | Patented | Mar. 30, 1971 |
| [73] | Assignee | Silver Lining, Inc. |
| | | Morgan City, La. |

[54] METHOD FOR REDUCING AND CLASSIFYING SUGAR CANE BAGASSE
5 Claims, No Drawings

[52] U.S. Cl. .................................................. 241/24, 241/28
[51] Int. Cl. ....................................................... B02c 19/00
[50] Field of Search ........................................ 241/24, 28; 146/76, 78, 116 (.1), 222, 130, 127, 209, 162, 19, 99 (Inquired)

[56] References Cited
UNITED STATES PATENTS

| 313,510 | 3/1885 | Meyer .......................... | 146/78 |
| 2,729,856 | 1/1956 | Horton .......................... | 241/28X |
| 3,216,886 | 11/1965 | Katzen .......................... | 241/28X |

*Primary Examiner*—Donald G. Kelly
*Attorney*—Brumbaugh, Graves, Donohue & Raymond ABSTRACT: Sugar cane bagasse in a dry state is reduced only to the extent that substantially all of the particles thereof are capable of passing through a sieve in the 5-mesh to 15-mesh range and then classified into a finer fraction of reduced crude fiber and high nutrient content containing all particles of a size within the range of from 30-mesh to 50-mesh and smaller and a coarser fraction of high crude fiber content containing all particles larger than those of the finer fraction. In this way, substantially the whole of the bagasse is usable, with minimum waste, as two separate fractions that are especially suited, respectively, for use as a food additive and as a basic ingredient for paper products and building and insulating materials.

METHOD FOR REDUCING AND CLASSIFYING SUGAR CANE BAGASSE

BACKGROUND OF THE INVENTION

This invention relates to the processing of sugar cane bagasse and, more particularly, to a method of separating sugar cane bagasse in a dry state into a fraction of low crude fiber content and high nutrient content and a fraction of high crude fiber content.

Bagasse is produced as a by product of the manufacture of raw sugar from sugar cane and is the term used in the industry to designate the woody fibrous residue of the can after the juice has been extracted. Because it is produced in large quantities, much attention has been directed in the past toward developing commercially valuable uses for bagasse. In particular, it has been used as a fuel in the sugar mills, as a raw material in the production of paper products and as a filler in the manufacture of building and insulating materials. It has also been used, but to a limited extent only, as an ingredient in cattle food of the type known as "molascuit." Notwithstanding this, large quantities of whole bagasse, or important portions of the bagasse, must ultimately be disposed of as waste because of the unsuitability of bagasse for the end uses intended or because significant and useful portions of it are destroyed during manufacturing processes.

For example, in the manufacture of such insulating and building materials as acoustical board and fiberboard, bagasse is typically fed through a shredder to a cooker which removes the resins, waxes and pectocellulose, and at the same time renders the fibers tough and flexible. From the cooker, the fibrous material is further processed to separate the bundles of fibers, to add waterproofing material and to form the board. Although this process makes use of the woody, fibrous portion of the bagasse, and in particular the crude fiber content of the bagasse, large portions of the bagasse are destroyed by cooking and the substantial nutrient content of the bagasse is totally lost.

The rather limited use of bagasse as a food additive is believed to be due at least in part to the large proportion of crude fiber contained in bagasse, i.e., that portion of the bagasse not susceptible of digestion and thus of no food value. As bagasse is ground and used whole in molascuit and similar products, all of the crude fiber is included in the food and is thought to offset, by virtue of the energy required to pass it through the digestive tract, the energy derived from the digestible constituents of the bagasse. Accordingly, the net food value of known forms of bagasse has been minimal.

SUMMARY OF THE INVENTION

The foregoing and other disadvantages associated with known uses of bagasse are overcome in accordance with the invention by a novel method which reduces the particles of the bagasse to a size range within which the constituents of the bagasse can be separated into two different products having different characteristics and uses by classifying the particles by size. The one product, the finer fraction, comprises a high percentage of constituents having high nutrient content and is especially suited for use as a food additive. The other product, the coarser fraction, is especially suited for use as a filler in the manufacture of paper products and building and insulating materials.

More specifically, a method of separating bagasse according to the invention includes the steps of (1) reducing the bagasse only to an extent that substantially all of the bagasse is capable of passing through a sieve within the range of from 5-mesh to 15-mesh and (2) classifying into a fine fraction of low crude fiber content and high nutrient content all of the reduced baggage particles of a size capable of passing through a sieve within the range of from 30-mesh to 50-mesh and into a coarse fraction of high crude fiber content all particles of larger size.

Reduction of the bagasse can be carried out in a pulverizer or grinder, and the pulverized bagasse is then passed to a particle classifier where the bagasse is separated into the finer and coarser fractions. Although satisfactory results are obtained if the size of the bagasse particles at the ends of the reducing and classifying steps are within the specified range, the bagasse is preferably reduced to a 10-mesh maximum size, i.e., only to the extent that substantially all of it can be passed by a 10-mesh sieve, and then classified into the separate fractions at the 40-mesh size, i.e., all particles capable of passing through a 40-mesh sieve being in the finer fraction and the remainder of the particles being in the coarser fraction.

DESCRIPTION OF THE INVENTION

It has been discovered that if bagasse in the dry state, i.e., in the form in which it typically is stored after milling, is subjected to a reducing operation under controlled conditions, it is then possible to separate the reduced particles into separate and distinct fractions, each a product suited for a particular and different use, namely, a finer fraction or flour high in nutrients and a coarser fraction or filler of high crude fiber content.

In accordance with the preferred embodiment of the invention, the bagasse is introduced into a reducing apparatus, for example, a pulverizer or grinder of suitable construction, and reduced only to the extent that substantially all of the particles are capable of passing through a 10-mesh sieve. In reducing the bagasse to the proper range overreduction of the particles is undesirable because it prevents classification of the particles into the desired distributions of high nutritional and high crude fiber content. Toward this end, reduction of the bagasse should not be extended beyond the point that the particles are a maximum size of approximately 10-mesh. There will, of course, also be produced particles of smaller sizes. In this way, an optimum gradation of particle sizes is produced so that upon subsequent classification the desired distributions of high nutritional and high crude filler constituents are obtained in the separate fractions.

If desired, a grating of proper mesh can be used to retain the bagasse within the reducing apparatus until the particles are reduced to the desired size. However, the reducing apparatus can be designed and controlled as to speed to reduce the bagasse to the proper extent.

Satisfactory results can be obtained if the reducing apparatus reduces the bagasse until substantially all of the particles are reduced within the range of from 5-mesh to 15-mesh and smaller, or that is to say, until the larger particles of the bagasse are reduced to the 5 to 15-mesh size.

The reduced bagasse is then classified into the finer and coarser fractions, by a sieve or any other suitable means, but preferably by use of a cyclone or centrifugal air classifier. Ideally particles of a size capable of being passed through a 40-mesh sieve are separated as the finer fraction and all larger particles are separated as the coarser fraction. Normally, division of the two fractions at the 40-mesh size provides optimum redistribution of the bagasse constituents, concentrating the nutrients in the finer flour and the crude fiber in the coarser fraction. Satisfactory results can be obtained by separating as the finer fraction particles of a size within the range of from 30 to 50-mesh size and smaller from the coarser particles.

The sieve numbers referred to herein are standard sieves having dimensions conforming to the requirements of ASTM Designation E—11, "Standard Specifications for Sieves for Testing Purposes."

Representative samples of fine and coarse fractions produced in accordance with the invention were analyzed to determine the composition of the separate fractions and, in particular, the crude fiber content of the coarse fraction and the crude fiber and nutrient content of the flour. All of the samples were subjected to the following tests:

1. Moisture—A 2 gram sample was dried for 4 hours at 100° C., cooled in a desiccator and weighed.
2. Carbohydrates—A 1 gram sample was extracted with 100 ml. of boiling water for 30 minutes. The extract was filtered and the filtrate utilized in the determination of carbohydrates by the well-known Anthrone technique.

3. Protein—A 1 gram sample was extracted with 50 ml. of 1 N sodium hydroxide in a boiling water bath for 30 minutes. The extract was filtered and the filtrates subjected to protein determinations by the Folin Phenol method.
4. Fat (lipids)—A 1 gram sample was extracted with 50 ml. of acetone at 45.5 C. for 13 minutes. The same was centrifuged and the supernatant dried in a flash evaporator. The sample was next extracted with 75 percent ethyl alcohol at 45.5° C. for 30 minutes. After being centrifuged, the supernatant was combined with the acetone extract and dried. The sample was then extracted with 75 percent ethyl alcohol ether (1:1) solution for 15 minutes. The supernatant after centrifugation was combined with the previous two extracts and dried. The total dry weight of lipid was then obtained by weighing.
5. Fiber—A 2 gram sample was extracted with boiling water for 1 hour, filtered, and the resulting fiber dried and weighed.
6. Crude fiber—A 2 gram sample was extracted with 50 ml. of ether for 30 minutes at room temperature. The extract was filtered and the resulting fiber extracted with 1.25 percent sulfuric acid for 30 minutes in a boiling water bath. The extract was filtered and washed with distilled water. The fiber was then extracted with 1.25 percent sodium hydroxide for 30 minutes in a boiling water bath, filtered and washed as before. The resulting fiber was then dried and weighed.
7. Ash—A 2 gram sample was placed in a muffle furnace for 2 hours at 650° C., cooled in a desiccator, and weighed.
8., 9. Calcium, Phosphorous—A 1 gram sample was extracted with 50 ml. of 0.1 N sulfuric acid for 30 minutes in a boiling water bath. The extract was filtered and the filtrate subjected to a phosphorous analysis using the Hycel method and a calcium determination using a Coleman Junior Flame Photometer.

TABLE I

| Sample | Fraction | (1) Moisture | (2) Carbohydrates | (3) Protein | (4) Fat | (5) Fiber | (6) Crude fiber | (7) Ash | (8) Calcium | (9) Phosphorus |
|---|---|---|---|---|---|---|---|---|---|---|
| 1a | Fine | 5.4 | 9.7 | 46.0 | 5.0 | 83.9 | 39.3 | 9.8 | 0.83 | 0.016 |
| 1b | Coarse | 5.9 | 8.8 | 41.0 | 4.9 | 84.5 | 53.4 | 10.6 | 0.34 | 0.005 |
| 2a | Fine | 3.7 | 9.0 | 40.8 | 4.7 | 87.4 | 34.1 | 8.6 | 0.82 | 0.021 |
| 2b | Coarse | 2.8 | 7.9 | 45.7 | 3.8 | 88.6 | 63.1 | 7.6 | 0.06 | 0.005 |

NOTE.—Numbers given are percentages by weight of original sample.

Table I includes a summation of the data obtained from the analysis of the bagasse samples. Samples 1a and 1b were taken from fractions produced by pulverizing the bagasse to a 10-mesh size and then separating all particles of 40-mesh size and less from the larger particles. Samples 2a and 2b, were taken from bagasse pulverized to a 10-mesh size and subsequently classified into fractions at the 80-mesh size.

Comparing the test results from samples 1a and 1b, it is evident that the fine fraction contains substantially less crude fiber than does the coarse fraction. A still more marked separation of crude fiber between the fine and coarse fractions is shown by the results from samples 2a and 2b, while the proportion of crude fiber to protein in the fine fraction is approximately the same as in sample 1a.

Another important and surprising feature of the invention is that the protein content of the fine fraction is at a high level and is significantly larger than the crude fiber content. It is also apparent from the data relating to samples 1a and 2a that the fine fractions contain slightly more carbohydrates and fats than do the coarse fractions.

The data of Table I demonstrate, therefore, that a clear division of the digestible material from the nondigestible material has been effected between the two fractions, with by far the larger portion of the nondigestible material being concentrated in the coarse fraction. This results in the production of a bagasse flour of high protein, carbohydrate, and fat content, relative to the crude fiber content, having an enlarged value as a food additive. At the same time, a coarse fraction is produced which is of increased usefulness in the production of paper products or in the manufacture of insulating and building materials.

I claim:

1. A method of separating sugar cane bagasse into a fine fraction high in nutrient content and low in crude fiber content and a coarse fraction high in crude fiber content comprising the steps of (1) reducing the bagasse in a dry state only to the extent that substantially all of the particles are capable of passing through a sieve in the 5-mesh to 15-mesh range and (2) classifying the reduced bagasse into a finer fraction of reduced crude fiber and high nutrient content containing all particles in the 30-mesh to 50-mesh range and smaller and a coarser fraction of high crude fiber content containing all particles larger than those of the finer fraction.

2. A method according to claim 1 in which the bagasse is reduced only to the extent necessary for substantially all of it to be passed by a 10-mesh sieve.

3. A method according to claim 2 in which the reduced bagasse is classified into a fine fraction containing all particles of a size passed by a 40-mesh sieve and a coarse fraction containing all particles retained on a 40-mesh sieve.

4. A method of separating sugar cane bagasse into a fine fraction of low crude fiber content and high nutrient content and a coarse fraction of high crude fiber content comprising the steps of (1) mechanically pulverizing the bagasse only to the extent that substantially all of it is capable of being passed by a sieve within the range of from 5-mesh to 15-mesh and (2) classifying the pulverized bagasse into a fine fraction containing all particles of a size passed by a sieve within the range of from 50-mesh to 30-mesh and a coarse fraction containing all particles of larger size.

5. A method according to claim 4 in which the bagasse is reduced only to the extent that substantially all of it is capable of being passed by a 10-mesh sieve and in which the pulverized bagasse is classified into a fine fraction containing all particles of a size passed by a 40-mesh sieve and a coarse fraction containing all particles retained by a 40-mesh sieve.